(12) United States Patent
Merkle et al.

(10) Patent No.: US 9,011,158 B2
(45) Date of Patent: Apr. 21, 2015

(54) HUMAN SURROGATE NECK MODEL

(71) Applicant: The Johns Hopkins University, Baltimore, MD (US)

(72) Inventors: Andrew C. Merkle, Gaithersburg, MD (US); Jack C. Roberts, Columbia, MD (US); Ian D. Wing, Baltimore, MD (US); Liming M. Voo, Laurel, MD (US); Craig B. Leese, Sykesville, MD (US); Howard A. Conner, Burlington, WV (US)

(73) Assignee: The Johns Hopkins University, Baltimore, MD (US)

( * ) Notice: Subject to any disclaimer, the term of this patent is extended or adjusted under 35 U.S.C. 154(b) by 311 days.

(21) Appl. No.: 13/761,239

(22) Filed: Feb. 7, 2013

(65) Prior Publication Data

US 2014/0220530 A1    Aug. 7, 2014

(51) Int. Cl.
*G09B 23/28* (2006.01)
*G09B 23/30* (2006.01)

(52) U.S. Cl.
CPC ..................................... *G09B 23/30* (2013.01)

(58) Field of Classification Search
USPC ................. 434/262, 267, 270, 272, 274, 275; 73/866.4
See application file for complete search history.

(56) References Cited

U.S. PATENT DOCUMENTS

| | | | |
|---|---|---|---|
| 3,754,338 A | 8/1973 | Culver | |
| 3,762,069 A * | 10/1973 | Culver | 434/274 |
| 3,877,156 A | 4/1975 | Itoh | |
| 4,624,642 A * | 11/1986 | Ferrara | 434/274 |
| 5,259,765 A * | 11/1993 | Richards | 434/274 |
| 5,672,059 A * | 9/1997 | Browne-Wilkinson | 434/274 |
| 6,230,574 B1 | 5/2001 | Rider et al. | |
| 6,422,874 B1 * | 7/2002 | Green et al. | 434/274 |
| 6,582,232 B1 * | 6/2003 | Ney | 434/270 |
| 6,769,286 B2 | 8/2004 | Biermann et al. | |
| 6,908,309 B2 * | 6/2005 | Gil et al. | 434/267 |
| 6,957,961 B1 | 10/2005 | Owens et al. | |
| 7,403,883 B2 * | 7/2008 | Heruth et al. | 703/11 |
| 8,113,847 B2 * | 2/2012 | Boachie-Adjei | 434/274 |
| 8,535,062 B2 * | 9/2013 | Nguyen | 434/267 |
| 8,535,063 B1 * | 9/2013 | Amato | 434/270 |
| 2006/0075826 A1 | 4/2006 | Roberts et al. | |

FOREIGN PATENT DOCUMENTS

| | | |
|---|---|---|
| GB | 2309814 | 8/1997 |
| GB | 2344922 | 6/2000 |
| GB | 2463247 | 3/2010 |
| WO | 2012044225 | 4/2012 |

* cited by examiner

*Primary Examiner* — Kurt Fernstrom
(74) *Attorney, Agent, or Firm* — Noah J. Hayward

(57) ABSTRACT

A human surrogate neck model includes a spinal neck region containing cervical vertebrae. A biosimulant intervertebral material is inserted between the cervical vertebrae. The spinal neck region is surrounded by a first silicone material mixed with a polymeric cross-linking inhibitor. One or more elastic tension bands are anchored to a top interface and a bottom interface of the neck model. A second silicone material mixed with a polymeric cross-linking inhibitor is applied to surround the spinal neck region and the first silicone material and to embed the tension bands. One or more of the elastic tension bands and/or a concentration ratio of the first silicone material or second silicone material to the polymeric cross-linking inhibitor can be adjusted for variable test conditions to closely simulate or mimic the static and dynamic characteristics of a human neck in various scenarios.

18 Claims, 10 Drawing Sheets

HUMAN SURROGATE NECK MODEL

STATEMENT OF GOVERNMENTAL INTEREST

This invention was made with government support under contract number N00024-03-D-6606 awarded by the Naval Sea Systems Command. The government has certain rights in the invention.

TECHNICAL FIELD

Example embodiments of the present invention generally relate to a surrogate neck model and, more particularly, relate to a surrogate neck model having material and mechanical properties substantially the same as that of a human neck.

BACKGROUND

A human surrogate neck model (HSNM) can be used for various testing, such as the effects of an impact upon the neck. Results of such testing can be used in the issuance of preventive measures or in the development of protective products.

Most HSNMs that are currently available are stiff and are difficult to demonstrate kinematic effects. Many parts of an HSNM are made of hard materials, such as metal and hard rubber discs, which do not mimic human tissue. In addition, the currently available HSNMs are not adjustable in any way and therefore, can only demonstrate one condition.

BRIEF SUMMARY

A human surrogate neck model according to example embodiments of the present invention is more biofidelic than a conventional neck model. It contains a polymeric material representing the vertebrae and intervertebral discs between the vertebrae. It has silicone gel materials representing the muscle and flesh in the neck. A human surrogate neck model according to example embodiments of the present invention can be "tuned" or made comparable to a fully validated parametric probabilistic computational neck model. The compliance of the neck can be easily changed, by varying a tension in elastic bands embedded in a surrounding silicone material, for example.

In an example embodiment, a human surrogate neck model contains a plurality of cervical vertebrae that makes up a spinal neck region. Biosimulant intervertebral discs are situated between the plurality of cervical vertebrae. A first silicone material surrounds the spinal neck region. A second silicone material is situated exterior to the first silicone material. A plurality of elastic tension bands are embedded in the second silicone material. The tension bands are anchored at a top interface and a bottom interface of the human surrogate neck model.

In another example embodiment, a method of making and adjusting a human surrogate neck model is described. A spinal neck region, containing cervical vertebrae is provided. A biosimulant intervertebral material is inserted in between each of the cervical vertebrae. The spinal neck region is surrounded by a first silicone material mixed with a polymeric cross-linking inhibitor. One or more elastic tension bands are anchored to a top interface and a bottom interface of the human surrogate neck model. A second silicone material mixed with a polymeric cross-linking inhibitor is applied to surround the spinal neck region and the first silicone material. The elastic tension bands are embedded in the second silicone material and polymeric cross-linking inhibitor mixture.

BRIEF DESCRIPTION OF THE DRAWINGS

The example embodiments and the advantages thereof will be better understood by reference to the following description taken in conjunction with the accompanying drawings. These drawings in no way limit any changes in form and detail that may be made to the described example embodiments by one of ordinary skill in the art without departing from the spirit and scope of the described embodiments. In the drawings.

DETAILED DESCRIPTION

Figure 1:
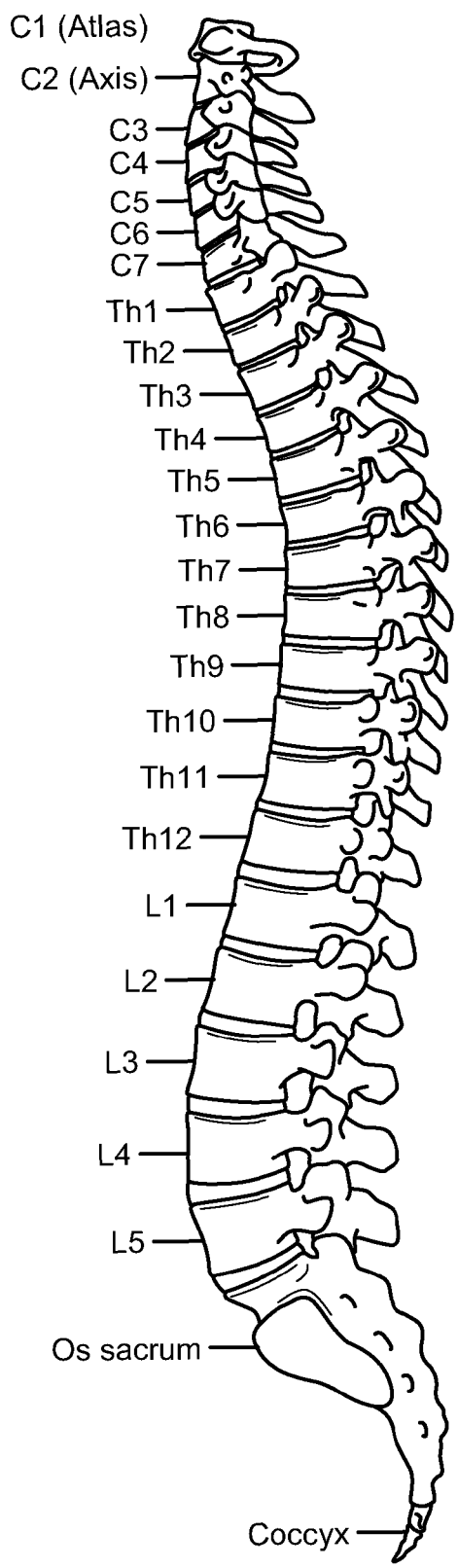
FIG. 1 is an illustration of a human spinal column according to embodiments of the invention.

FIG. 1 illustrates a human spinal column, which illustrates different regions of the various vertebrae. The spinal cord is the primary pathway for information connecting the brain and the peripheral nervous system throughout the body. There are seven cervical vertebrae, labeled as C1 through C7. Nerves from the cervical vertebrae control the neck and upper body movements, such as the diaphragm and arms. There are seven thoracic vertebrae, labeled as T1 through T7. Nerves from the thoracic vertebrae control the trunk above the waist. There are five lumbar vertebrae, labeled as L1 through L5. Nerves from the lumbar vertebrae control the legs and feet. There are two sacral vertebrae, labeled as S1 and S2. Nerves from the sacral vertebrae control the feet and toes.

The cervical vertebrae, illustrated in FIG. 1 have nerves that exit the vertebrae. The associated nerves are responsible for upper body movement and function. Nerves from all of C1 through C6 cervical vertebrae are responsible for neck flexion. Nerves from all of C1 through C7 cervical vertebrae, along with nerves from T1 thoracic vertebra, are responsible for neck extension. Nerves from C3, C4, and C5 cervical vertebrae control the diaphragm, although most of the nerve control comes from the C4 nerve. Nerves from C5 and C6 cervical vertebrae control shoulder movement and raise the arms. Flexion of the elbows is also controlled by nerves from C5 and C6, while nerves from C6 externally rotate the arms. Nerves from C6 and C7 cervical vertebrae control extension of the elbows and wrists, and also control pronation of the wrists. Nerves from C7 cervical vertebra and T1 thoracic vertebra control flexion of the wrists.

FIG. 1 illustrates that a large number of cervical vertebrae and associated nerves are responsible for neck movement. Therefore, a neck model needs to consider multiple variables in attempting to mimic a real human response within the neck region.

A more biofidelic, i.e. more life-like human surrogate neck model has been developed. The human surrogate neck model mimics the response of the human neck at high rate loading with minimal muscle activation, such as that expected in a sudden blast or ballistic impact. However, embodiments of the invention also contemplate other objectives or uses for the human surrogate neck model, such as vehicle crash testing and sports impact testing.

Figure 2:
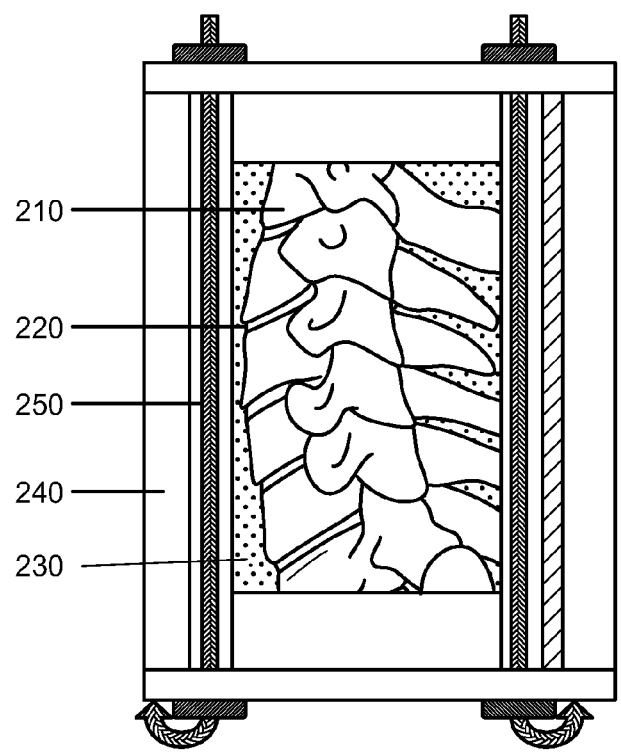
FIG. 2 is an illustration of a human surrogate neck model according to embodiments of the invention.

FIG. 2 illustrates a human surrogate neck model according to embodiments of the invention. The skeletal anatomy contains cervical vertebrae 210, such as the cervical vertebrae illustrated in FIG. 1. Intervertebral discs 220 reside between the cervical vertebrae 210, which are composed of a biosimulant intervertebral material that mimics the mechanics of human tissue. There are two collars of silicone material that surround the interior cervical vertebrae 210. A first silicone material 230 surrounds the cervical vertebrae 210 and the intervertebral discs 220. In one example embodiment, the first silicone material 230 directly surrounds the cervical vertebrae 210 and the intervertebral discs 220. A second silicone material 240 surrounds the cervical vertebrae 210, the intervertebral discs 220, and the first silicone material 230. The two collars of silicone material may have different densities. Pathways for one or more elastic tension cables 250 are embedded in the second silicone material 240, which run the axial length of the neck (e.g., from top to bottom and vice versa in FIG. 2). The elastic tension cables 250 are adjustable to further constrain the response. Adjustment of the properties of the first silicone material 230 and the second silicone material 240 also provides a means of tuning the variable stiffness of the surrogate neck model. The surrogate neck model has a top interface, e.g., the upper portion of the neck model shown in FIG. 2, and a bottom interface, e.g., the lower portion of the neck model shown in FIG. 2, designed to be attached to a surrogate head model, such as a Hybrid III head, and/or to a surrogate torso model, respectively.

The cervical vertebrae 210 can be formed with commercial off-the-shelf (COTS) solid plastic pieces. The intervertebral discs 220 are formed with urethane in a preferred embodiment, such as polyurea elastomer. The polyurea elastomer is a combination of a resin and a hardener, which closely mimics actual human intervertebral disc material.

The first silicone material 230 and the second silicone material 240 both contain a mixture of a silicone rubber with varying amounts of a polymeric cross-linking inhibitor. In an embodiment, the silicone rubber comprises a P-10 room temperature vulcanizing (RTV) silicone rubber. A "deadener" is added to both of the first silicone material 230 and the second silicone material 240. The "deadener" inhibits cross-linking of the polymers and results in a more compliant material when mixed with the silicone rubber. In embodiments of the invention, the first silicone material 230 and the second silicone material 240 will usually have different concentrations of the two materials, which results in different densities. The first silicone material 230 is designed to mimic human muscle tissue and the second silicone material 240 is designed to mimic human skin tissue under various sets of conditions. As an example, the first silicone material 230 and the second silicone material 240 will take on a first set of properties when the mimicked conditions entail a muscle-relaxed state, whereas the first silicone material 230 and the second silicone material 240 will take on a second set of properties when the mimicked conditions entail a muscle-tensed state.

The elastic tension cables 250 comprise multiple cables that run the lateral length of the human surrogate neck model and are anchored at a top region and at a bottom region of the neck model. In an embodiment, the elastic tension cables 250 comprise three bands anchored at different angles at two opposite sides of the neck model. In an embodiment, bungee cords can be used for the elastic tension cables 250. However, other materials that can be adjusted and other combinations of tension cables can be used to mimic various conditions of the human neck.

Testing was conducted, in which the combined head and neck surrogate model had a tri-axial accelerometer package and an angular rate sensor mounted at the head center of gravity. Various tests were conducted, such as benchtop tests to characterize the response of the neck to simple quasi-static loading and to dynamic testing. Test results were compared to a fully validated parametric probabilistic computational neck model. Adjustments were made to the surrogate neck model in order to closely match the computational mathematical model.

Figure 3:
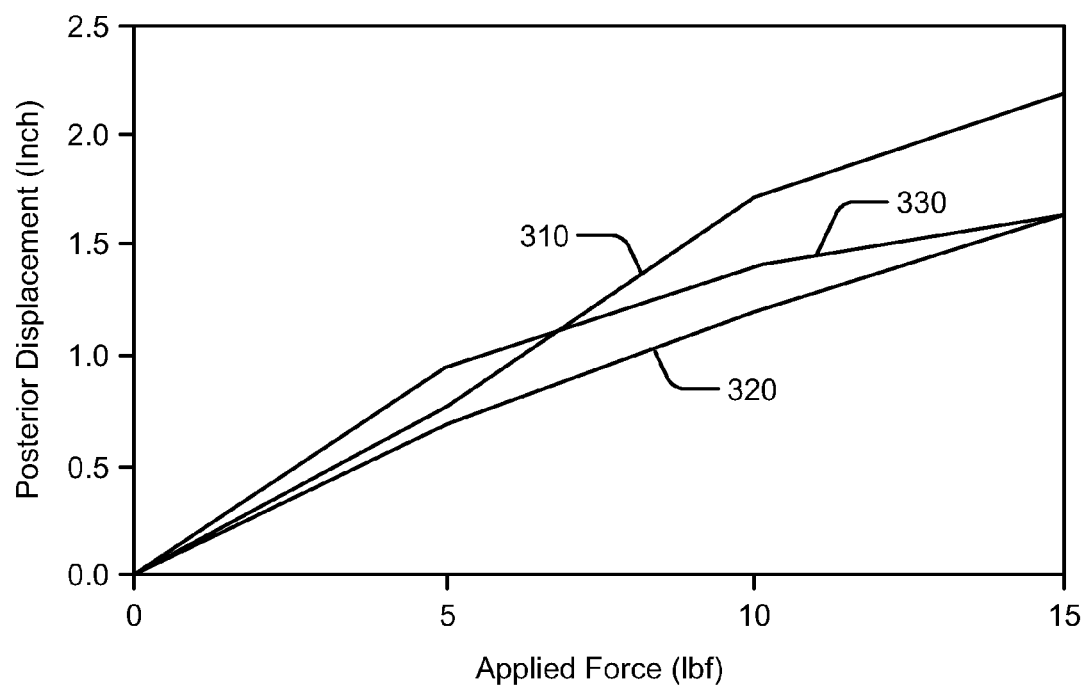
FIG. 3 is a graph illustrating test results from an applied static force according to embodiments of the invention.

Static forces were applied in the posterior direction at a point near the occipital condyle joint. The occipital condyle joint is a protrusion on the occipital bone of the skull that forms a joint with the first cervical vertebra, enabling the head to move relative to the neck. Forces of 5, 10, and 15 pounds-force (lbf) were applied, but other forces are also contemplated by embodiments of the invention. The response of the neck was recorded with video for analysis of the translation and rotation of the head under load. The tension of the elastic tension cables 250 were adjusted to mimic a relaxed muscle state and a tensed muscle state. A graph of the test results from an applied static force is shown in FIG. 3. Results in the relaxed muscle state 310 show a steep increase in displacement of the head versus an applied force. However, results from the tensed muscle state 320 show a nearly linear, but smaller increase in displacement of the head versus an applied force. Simulation results for the comparative mathematical model 330 are also shown.

Dynamic shock tube tests were conducted on the human surrogate neck model and attached head to assess the behavior of the neck model in the high rate loading domain. A shock tube is an instrument used to replicate and direct blast waves at a sensor or a model to simulate actual explosions and their effects. A shock tube is a rectangular or circular tube, usually constructed of metal, in which a gas at low pressure and a gas at high pressure are separated by a diaphragm. The diaphragm can be made from plastic for low burst pressures, aluminum or copper for moderate burst pressures, and mild steel or stainless steel for high burst pressures. However, other materials that meet the desired criteria for a particular burst pressure can be used. The diaphragm suddenly bursts open under predetermined conditions to produce a wave propagating through the low pressure section. The shock that eventually forms increases the temperature and pressure of the test gas and induces a flow in the direction of the shock wave. The bursting diaphragm produces a series of pressure waves that are recorded.

Forces of 75, 100, and 125 pounds per square inch gage (psig) were applied to test the human surrogate neck model, but other forces are also contemplated by embodiments of the invention. The head was unconstrained and the base of the neck was rigidly fixed. Load cells measured forces and moments in and about all three axes, as well as rotations, at the upper and lower portions of the neck. Kinetic and kinematic data was recorded from the electronic sensors.

Figure 4A:
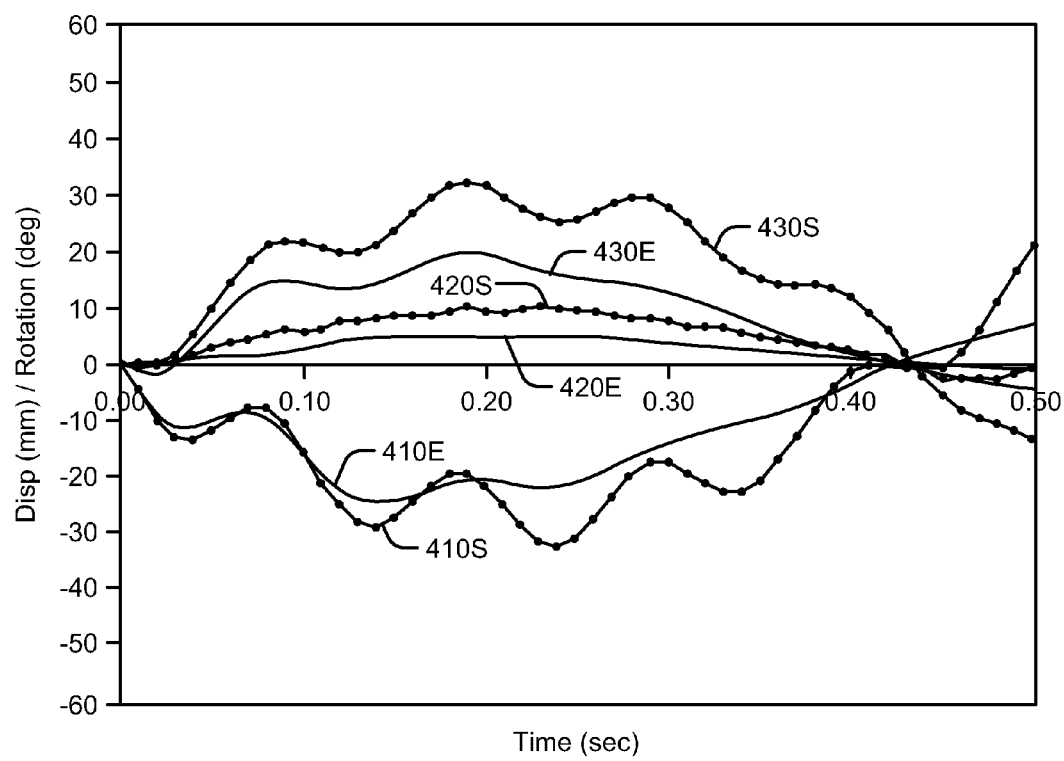
FIGS. 4A-4C are graphs illustrating test results from an applied dynamic force in a relaxed muscle state according to embodiments of the invention.
Figure 4B:
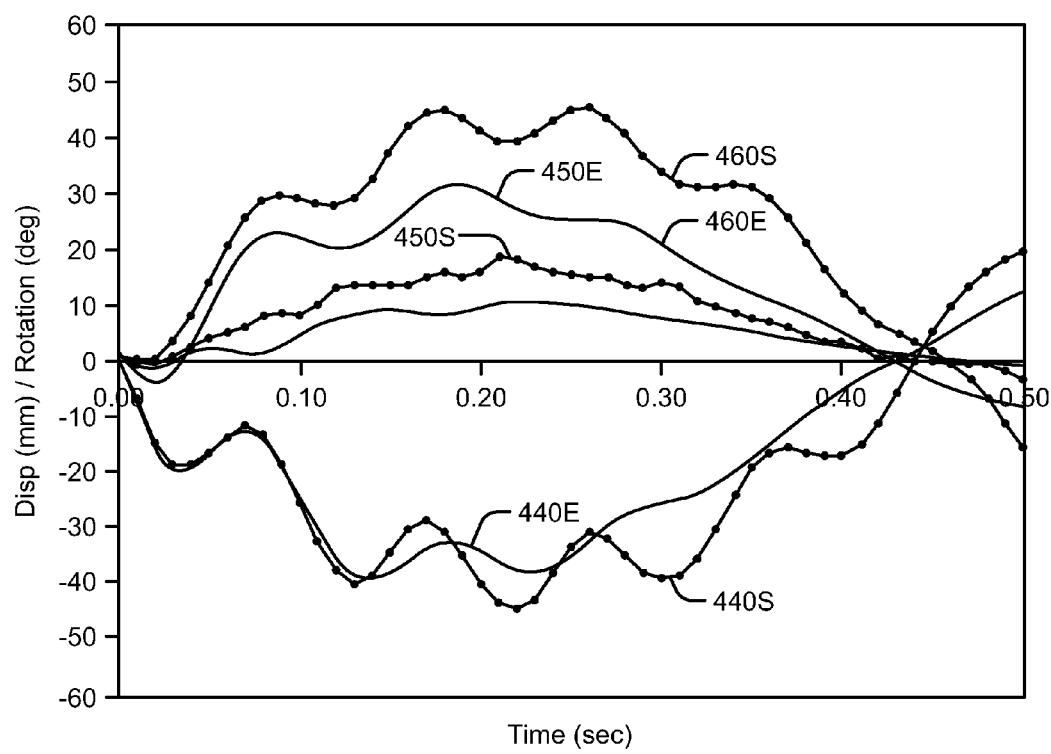
Figure 4C:
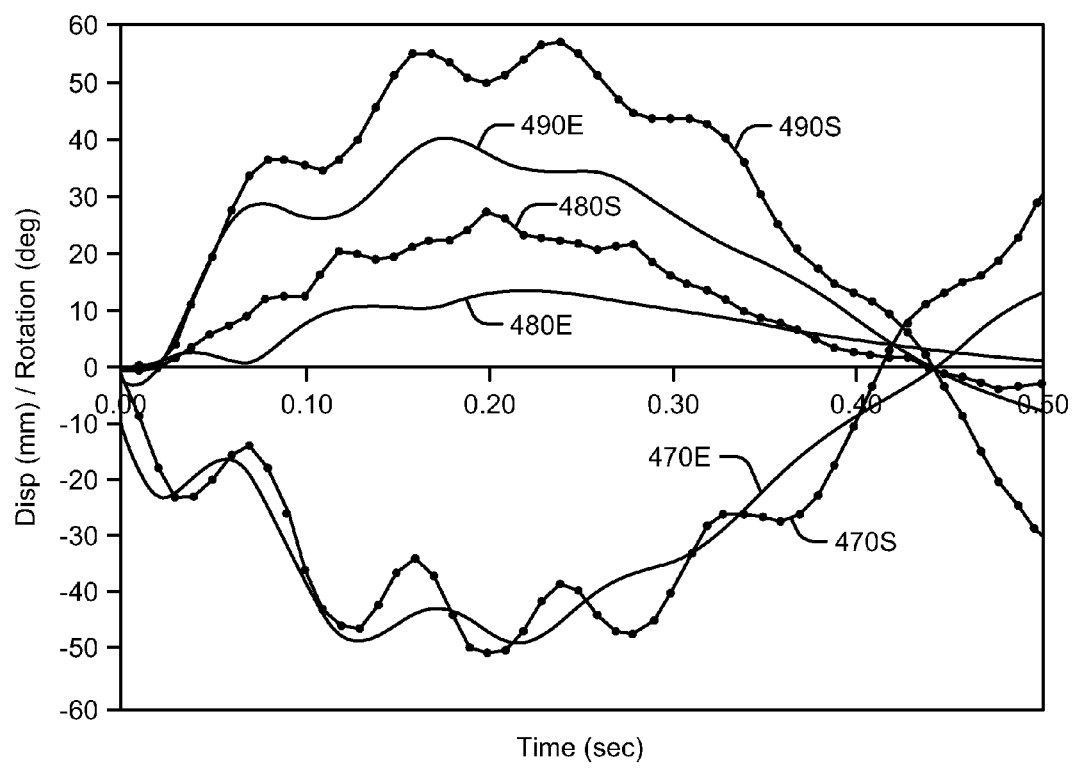

FIGS. 4A-4C show the results of forces applied to the human surrogate neck model with an attached surrogate head, in a relaxed muscle state. FIG. 4A shows results from an applied force of 75 psig. Lines 410E and 410S show the displacement in the x-axis direction for experimental results and the mathematical model simulation results, respectively from the applied 75 psig force. Lines 420E and 420S show the displacement in the z-axis direction for experimental results and the mathematical model simulation results, respectively from the applied 75 psig force. Lines 430E and 430S show the rotation of the head and neck surrogate model for experimental results and the mathematical model simulation results, respectively from the applied 75 psig force.

FIG. 4B shows results from an applied force of 100 psig. Lines 440E and 440S show the displacement in the x-axis direction for experimental results and the mathematical model simulation results, respectively from the applied 100 psig force. Lines 450E and 450S show the displacement in the z-axis direction for experimental results and the mathematical model simulation results, respectively from the applied 100 psig force. Lines 460E and 460S show the rotation of the head and neck surrogate model for experimental results and the mathematical model simulation results, respectively from the applied 100 psig force.

FIG. 4C shows results from an applied force of 125 psig. Lines 470E and 470S show the displacement in the x-axis direction for experimental results and the mathematical model simulation results, respectively from the applied 125 psig force. Lines 480E and 480S show the displacement in the z-axis direction for experimental results and the mathematical model simulation results, respectively from the applied 125 psig force. Lines 490E and 490S show the rotation of the head and neck surrogate model for experimental results and the mathematical model simulation results, respectively from the applied 125 psig force.

Figure 5A:
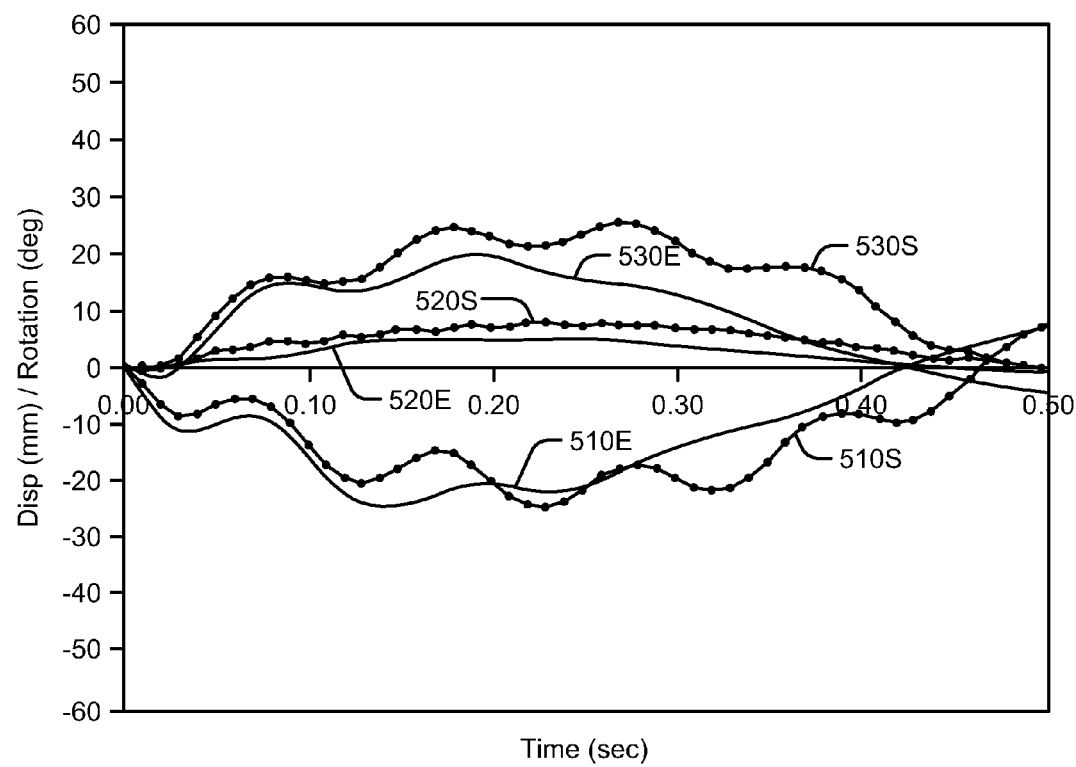
FIGS. 5A-5C are graphs illustrating test results from an applied dynamic force in a tensed muscle state according to embodiments of the invention.
Figure 5B:
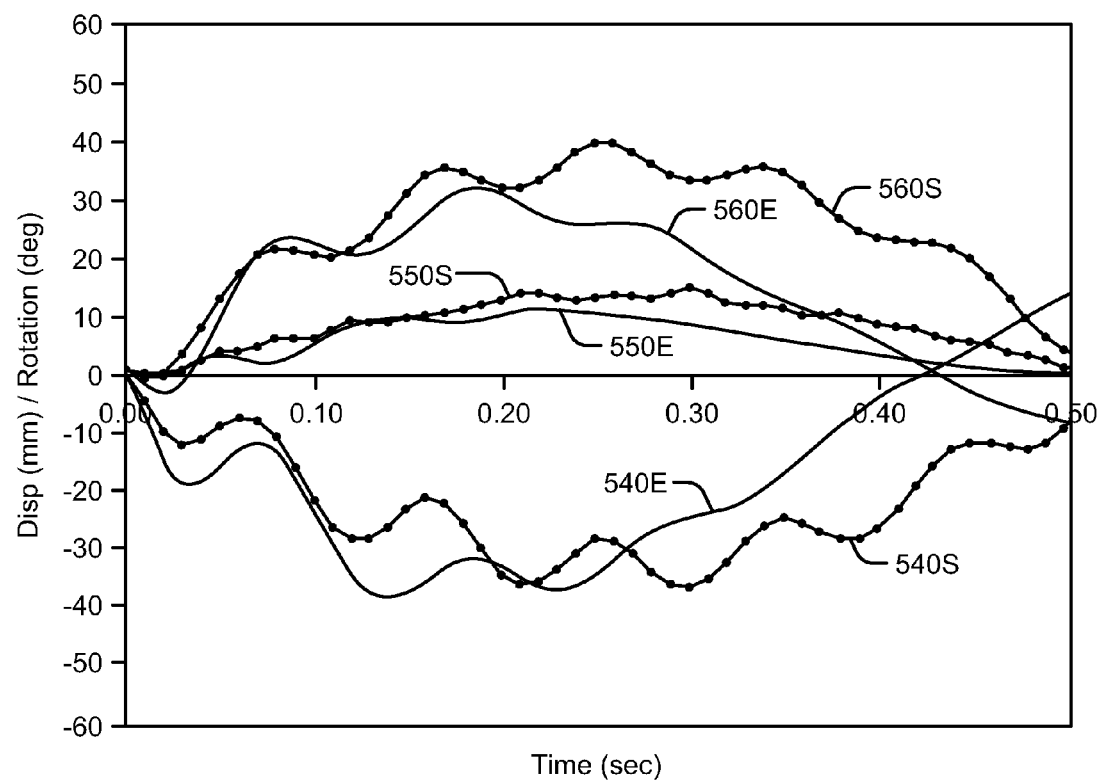
Figure 5C:
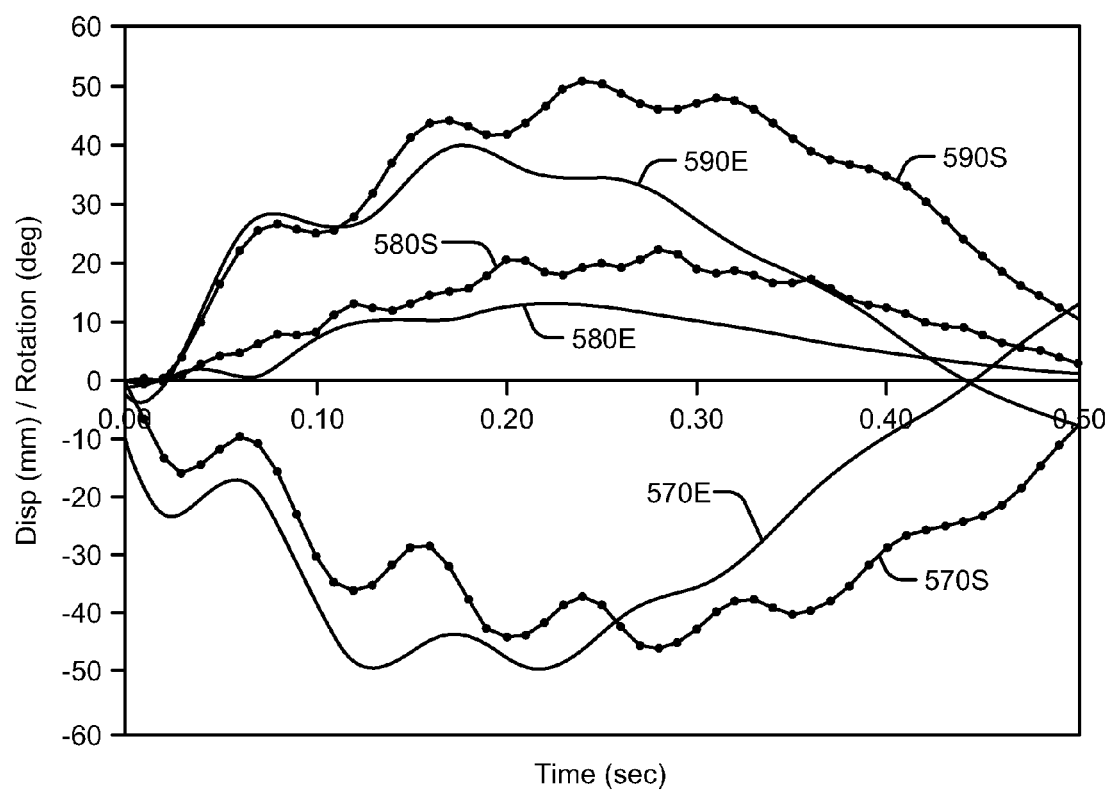

FIGS. 5A-5C show the results of forces applied to the human surrogate neck model with an attached surrogate head, in a tensed muscle state. FIG. 5A shows results from an applied force of 75 psig. Lines 510E and 510S show the displacement in the x-axis direction for experimental results and the mathematical model simulation results, respectively from the applied 75 psig force. Lines 520E and 520S show the displacement in the z-axis direction for experimental results and the mathematical model simulation results, respectively from the applied 75 psig force. Lines 530E and 530S show the rotation of the head and neck surrogate model for experimental results and the mathematical model simulation results, respectively from the applied 75 psig force.

FIG. 5B shows results from an applied force of 100 psig. Lines 540E and 540S show the displacement in the x-axis direction for experimental results and the mathematical model simulation results, respectively from the applied 100 psig force. Lines 550E and 550S show the displacement in the z-axis direction for experimental results and the mathematical model simulation results, respectively from the applied 100 psig force. Lines 560E and 560S show the rotation of the head and neck surrogate model for experimental results and the mathematical model simulation results, respectively from the applied 100 psig force.

FIG. 5C shows results from an applied force of 125 psig. Lines 570E and 570S show the displacement in the x-axis direction for experimental results and the mathematical model simulation results, respectively from the applied 125 psig force. Lines 580E and 580S show the displacement in the z-axis direction for experimental results and the mathematical model simulation results, respectively from the applied 125 psig force. Lines 590E and 590S show the rotation of the head and neck surrogate model for experimental results and the mathematical model simulation results, respectively from the applied 125 psig force.

The results illustrated in FIGS. 3, 4A-4C, and 5A-5C demonstrate that the inventive aspects of the human surrogate neck model, according to embodiments described herein, closely resemble results of the simulated mathematical neck model. The experimental results closely mimic expected lifelike conditions in all three dimensions for displacement and rotation for both a relaxed muscle state and a tensed muscle state, as a result of applied static and dynamic forces.

Figure 6:
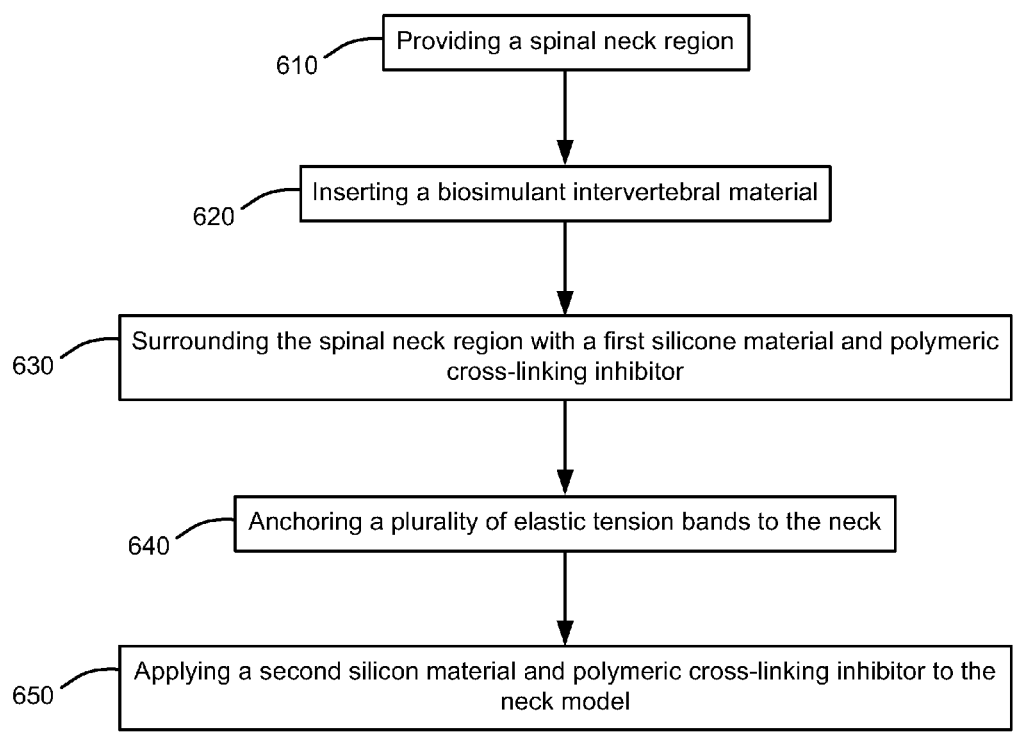
FIG. 6 is a flowchart for a method of making and adjusting a human surrogate neck model according to embodiments of the invention.

FIG. 6 is a flowchart for a method of making and adjusting a human surrogate neck model, according to embodiments of the invention. A spinal neck region containing a plurality of cervical vertebrae is provided in step 610. A biosimulant intervertebral material is inserted in between each of the plurality of cervical vertebrae in step 620. The spinal neck region is surrounded with a mixture of a first silicone material and a polymeric cross-linking inhibitor in step 630. A plurality of elastic tension bands are anchored to a top interface and a bottom interface of the human surrogate neck model in step 640. A second silicone material mixed with a polymeric cross-linking inhibitor is applied to surround the spinal neck region and the first silicone material in step 650. The plurality of elastic tension bands are embedded in the second silicone material.

The surrogate neck model, according to embodiments of the invention described herein, can be varied by: a) adjusting one or more of the tension cables, b) adjusting the concentration ratio of silicone to polymeric cross-linking inhibitor for the first silicone material, and/or c) adjusting the concentration ratio of silicone to polymeric cross-linking inhibitor for the second silicone material. Adjusting the tension of one or more of the tension cables allows the surrogate neck model to mimic a muscular state from a completely relaxed state to a completely tensed state in different areas of the neck. Adjusting the concentration ratios of the first or second silicone material to the polymeric cross-linking inhibitor allows the human surrogate neck model to mimic multiple states of muscle and/or skin tone to match a real-life situation. The first silicone material can be adjusted to mimic human muscle tissue, and the second silicone material can be adjusted to mimic human skin. Therefore, one or more of the above adjustments can be made to the human surrogate neck model, in order to mimic a condition or state of the human body, particularly the neck, when the human body experiences a real-life condition, such as a blast or ballistic impact, a vehicle crash, a fall, or a contact sports collision.

While the description and drawings herein contain many specifics, these specifics should not be construed as limitations of the many example embodiments of the present invention, but merely as exemplifications thereof. Those of ordinary skill in the art will envision many other embodiments within the scope and spirit of the invention as defined by the claims appended hereto.

What is claimed is:

1. A surrogate neck model, comprising:
 a top interface;
 a bottom interface disposed below the top interface;
 a spinal neck region disposed between the top and bottom interfaces and comprising cervical vertebrae;
 biosimulant intervertebral discs situated between the cervical vertebrae;
 a first silicone material surrounding the spinal neck region;
 a second silicone material disposed outside of the first silicone material; and
 one or more elastic tension bands embedded in the second silicone material and anchored at the top interface and the bottom interface.

2. The surrogate neck model of claim 1, wherein the biosimulant intervertebral discs comprise urethane.

3. The surrogate neck model of claim 1, wherein a density of the first silicone material differs from a density of the second silicone material.

4. The surrogate neck model of claim 1, wherein a tension of the plurality of elastic tension bands is adjustable.

5. The surrogate neck model of claim 1, wherein the top interface comprises an interface connectable to a human surrogate head model.

6. The surrogate neck model of claim 1, wherein the bottom interface comprises an interface connectable to a human surrogate torso model.

7. The surrogate neck model of claim 1, wherein at least one of the first silicone material and the second silicone material comprise a silicone rubber.

8. The surrogate neck model of claim 7, wherein the at least one of the first silicone material and the second silicone material further comprises a polymeric cross-linking inhibitor.

9. A method of making and adjusting a surrogate neck model, the method comprising:
   providing a spinal neck region, comprising cervical vertebrae;
   inserting a biosimulant intervertebral material between the cervical vertebrae;
   surrounding the spinal neck region with a first silicone material mixed with a polymeric cross-linking inhibitor;
   anchoring one or more elastic tension bands to a top interface and a bottom interface of the human surrogate neck model; and
   applying a second silicone material mixed with a polymeric cross-linking inhibitor to surround the spinal neck region and the first silicone material, the elastic tension bands being embedded in the a second silicone material.

10. The method of claim 9, further comprising adjusting the one or more elastic tension bands to mimic a muscle-relaxed state.

11. The method of claim 9, further comprising adjusting the one or more elastic tension bands to mimic a muscle-tensed state.

12. The method of claim 9, further comprising adjusting an amount of the polymeric cross-linking inhibitor in the first silicone material to mimic human muscle tissue.

13. The method of claim 9, further comprising adjusting an amount of the polymeric cross-linking inhibitor in the second silicone material to mimic human skin.

14. The method of claim 9, further comprising:
   applying static and dynamic tests to the human surrogate neck model in combination with a human surrogate head model connected to the top interface; and
   adjusting characteristics of the human surrogate neck model to mimic a kinematic reaction thereof to a real-life event.

15. The method of claim 14, wherein the adjusting characteristics comprises adjusting one or more of: a) a tension of the one or more elastic tension bands, b) a ratio of the first silicone material to the polymeric cross-linking inhibitor, and c) a ratio of the second silicone material to the polymeric cross-linking inhibitor.

16. The method of claim 15, wherein the real-life event comprises a blast or ballistic impact.

17. The method of claim 15, wherein the real-life event comprises a vehicle crash.

18. The method of claim 15, wherein the real-life event comprises a sports collision.

* * * * *